(12) United States Patent
Thevenet et al.

(10) Patent No.: US 10,332,262 B2
(45) Date of Patent: Jun. 25, 2019

(54) REMOVAL OF BACKGROUND INFORMATION FROM DIGITAL IMAGES

(71) Applicant: Adobe Inc., San Jose, CA (US)

(72) Inventors: Frederic Thevenet, San Jose, CA (US); Fan Yu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/435,252

(22) Filed: Feb. 16, 2017

(65) Prior Publication Data
US 2018/0232888 A1 Aug. 16, 2018

(51) Int. Cl.
| | | |
|---|---|---|
| G06K 9/34 | (2006.01) |
| G06K 9/00 | (2006.01) |
| G06K 9/40 | (2006.01) |
| G06T 7/194 | (2017.01) |
| G06T 7/11 | (2017.01) |
| G06T 11/60 | (2006.01) |
| G06K 9/46 | (2006.01) |
| G06T 5/00 | (2006.01) |
| G06T 5/40 | (2006.01) |
| G06T 7/136 | (2017.01) |

(52) U.S. Cl.
CPC .......... *G06T 7/194* (2017.01); *G06K 9/00442* (2013.01); *G06K 9/40* (2013.01); *G06K 9/4647* (2013.01); *G06T 5/008* (2013.01); *G06T 5/40* (2013.01); *G06T 7/11* (2017.01); *G06T 7/136* (2017.01); *G06T 11/60* (2013.01); *G06T 2207/10008* (2013.01); *G06T 2207/30176* (2013.01)

(58) Field of Classification Search
USPC ................................ 382/162, 176, 180, 266
See application file for complete search history.

(56) References Cited

U.S. PATENT DOCUMENTS

| | | | |
|---|---|---|---|
| 6,263,091 B1* | 7/2001 | Jain .................... | G06K 9/00067 382/124 |
| 8,270,716 B2* | 9/2012 | Fujimoto ............... | H04N 19/23 382/176 |
| 2003/0048461 A1* | 3/2003 | Larson .................... | H04N 1/407 358/1.9 |
| 2004/0047504 A1* | 3/2004 | Suzuki ..................... | H04N 1/60 382/166 |
| 2008/0031549 A1* | 2/2008 | Konishi ............. | G06K 9/00449 382/305 |

(Continued)

*Primary Examiner* — Kathleen Y Dulaney
(74) *Attorney, Agent, or Firm* — Kilpatrick Townsend & Stockton LLP

(57) ABSTRACT

Computerized methods and systems remove background information from digitally encoded images. A digitally encoded image is retrieved and converted to greyscale if it is encoded as a color image. The greyscale image is divided into a first set of subsections. The first set of subsections is processed to individually remove any background portions from each subsection of the first set of subsections. The greyscale image may also be divided into a second set of subsections and the second set of subsections is processed to individually remove any background portions from each subsection of the second set of subsections containing contours. The first set of subsections and second set of subsections may be merged to create a new version of the image, and the new version of the image is stored to digital storage.

20 Claims, 13 Drawing Sheets

(56) References Cited

U.S. PATENT DOCUMENTS

| | | | | |
|---|---|---|---|---|
| 2008/0137153 | A1* | 6/2008 | Kunori | G06K 9/00 358/462 |
| 2008/0175476 | A1* | 7/2008 | Ohk | G06K 9/00456 382/176 |
| 2008/0304762 | A1* | 12/2008 | Matsumoto | G06K 9/38 382/243 |
| 2009/0128871 | A1* | 5/2009 | Patton | G06T 11/001 358/520 |
| 2013/0050764 | A1* | 2/2013 | Zhan | H04N 1/403 358/2.1 |
| 2013/0259383 | A1* | 10/2013 | Kondo | G06K 9/46 382/199 |
| 2014/0072219 | A1* | 3/2014 | Tian | G06K 9/346 382/171 |
| 2014/0169668 | A1* | 6/2014 | Vugdelija | G06F 3/0425 382/165 |
| 2014/0185933 | A1* | 7/2014 | Tian | G06K 9/00577 382/173 |
| 2014/0193029 | A1* | 7/2014 | Vassilieva | G06K 9/342 382/103 |
| 2015/0169992 | A1* | 6/2015 | Ioffe | G06F 16/51 382/218 |
| 2015/0278661 | A1* | 10/2015 | Hasegawa | H04N 1/00 358/1.9 |
| 2016/0163059 | A1* | 6/2016 | Xie | G06T 7/11 382/173 |

* cited by examiner

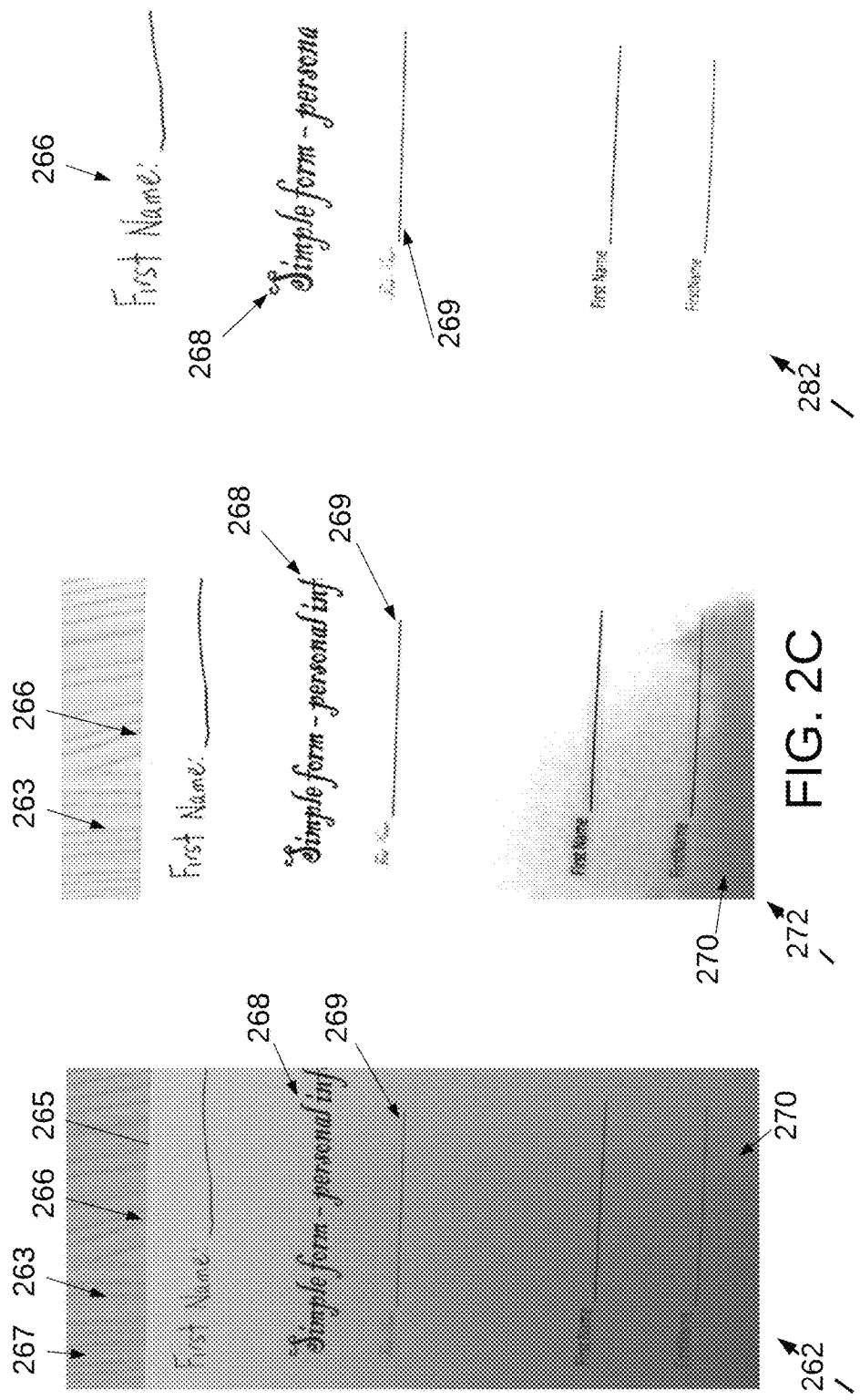

REMOVAL OF BACKGROUND INFORMATION FROM DIGITAL IMAGES

FIELD OF THE DISCLOSURE

This disclosure relates generally to the field of data processing and more particularly to computerized image processing.

BACKGROUND

Use of digital images has become commonplace in both business and recreational environments. This increased usage results in people increasingly seeking to insert images into documents such as word processing documents, presentations, spreadsheets or social networking applications. It is often desirable to remove the background of an image document to remove unnecessary information from the image. For example, in images that have been generated by a document scanner or camera there may be unwanted background information. A common approach is to attempt to remove the background of an image document as a whole. However, image documents are often affected by different lighting in different areas of the document. Removing the background of entire image documents often generates noise in the dark portions of the document while causing image information in the lighter areas of the document to become too light or even get lost.

BRIEF DESCRIPTION OF THE DRAWINGS

The accompanying drawings, which are incorporated in and constitute a part of this specification exemplify the embodiments of the present invention and, together with the description, explain and illustrate principles of the inventive techniques disclosed herein. Specifically:

FIGS. 2A, 2B and 2C each show a separate example of an original image along with the image processed according to a known technique and an embodiment of the invention.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
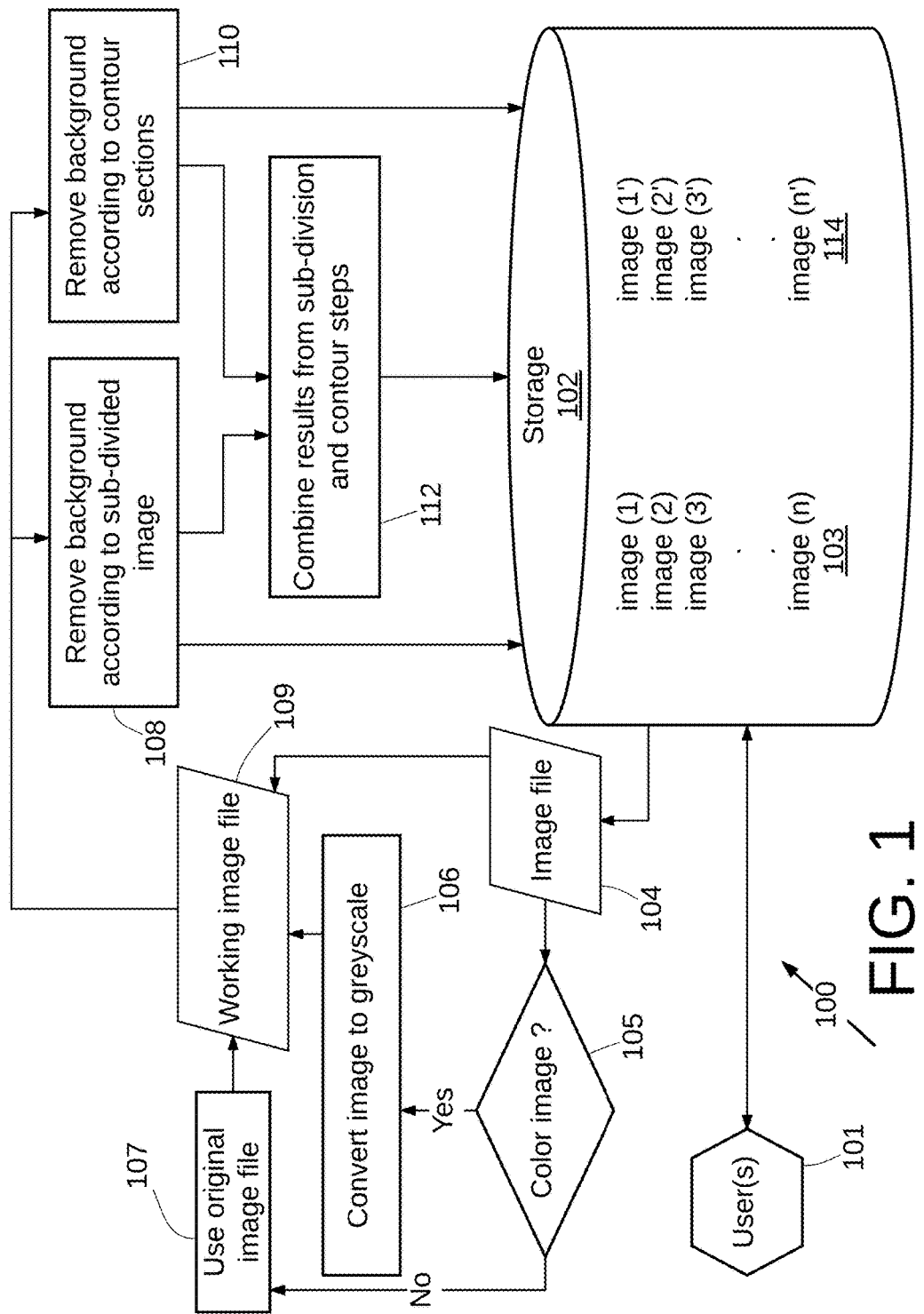
FIG. 1 is a high-level flowchart illustrating removal of background information from digital images in accordance with embodiments of the invention.

As noted above, a significant challenge in removing background information from an image document is that the document can be affected by different lighting in different areas of the image. Removing the background from the entire image document can cause noise in dark areas and light areas getting too light or even getting lost. The methods and systems disclosed herein improve removal of background information from digital images by partitioning the image document into subsections and then removing background in the subsections independently. In this way, dark areas in the document have less or no effect on the light areas, and vice versa. Moreover, the methods and systems disclosed herein partition the image into two sets of subsections, independently remove the background from each set of subsections, and combine the two sets of subsections. The result is a much cleaner document with the background removed. Partitioning of the image and removal of background information is performed independently of the image content to generate the first set of subsections. Removal of background information from the second set of subsections is performed as a function of the image content to generate the second set of subsections. Employing the two partitioning techniques, independent of image content and as a function of image content, has several benefits. Partitioning independent of image content and then removing background information can create noise pixels along the edge of the subsections or in areas which are away from the document contents (foreground information). Removal of background information as a function of image content can create noise pixels around the document contents. Combining both techniques advantageously generates cleaner results in removal of background information from digitally encoded image documents. FIG. 1 is a high-level flowchart illustrating removal of background information from digital images in accordance with embodiments of the invention. In FIG. 1, a computer system, shown generally at 100, includes digital storage 102 that stores image content, shown generally at 103, and a processor (shown in FIG. 9) that executes instructions to implement steps 105-112. Digital storage 102 is shown generally but can take a variety of forms of storage for digital content including storage that is spread physically across numerous storage devices and also that is partially or wholly distant physically from other portions of system 100. The digital image content 103 includes a plurality of digital images, shown as image (1)-image (n), which may be individually encoded in accordance with a variety of encoding formats including known encoding formats such as JPEG and PDF, and which may be stored as individual files. Images in the image content 103 may include grey scale images, color images and may be of different resolutions and image sizes.

As used herein, the term color image refers to a digitally encoded image with encoding per pixel (typically three values per pixel for encoding the Red Green Blue (RGB) color space) for intensity and chrominance of light. The term greyscale image refers to a digitally encoded image in which the value of each pixel is a single sample, that is, it carries only intensity information. The term black and white (B/W) image refers to a digitally encoded image in which there are only two possible values for each pixel (binary color encoding). Typically, the two colors used for a binary image are black and white, though any two colors can be used. The color used for the object(s) in the image is the foreground color while the rest of the image is the background color. As used herein, the term "foreground" when used in connection with an image refers to pixels within a black and white version of the image that are black and surrounded by one or more boundary pixels. The term "background" as used herein in connection with an image refers to pixels within a black and white version of an image that are white.

The image content 103 may be entered into system 100 and subsequently retrieved for viewing or other use by one or more user(s) 101. Such users may be located locally to system 100 or may be located remotely from system 100 and interact with system 100 via an internet connection. System 100 may be used by a large number of users and storage 102 may therefore contain large volumes of content.

Figure 2A:
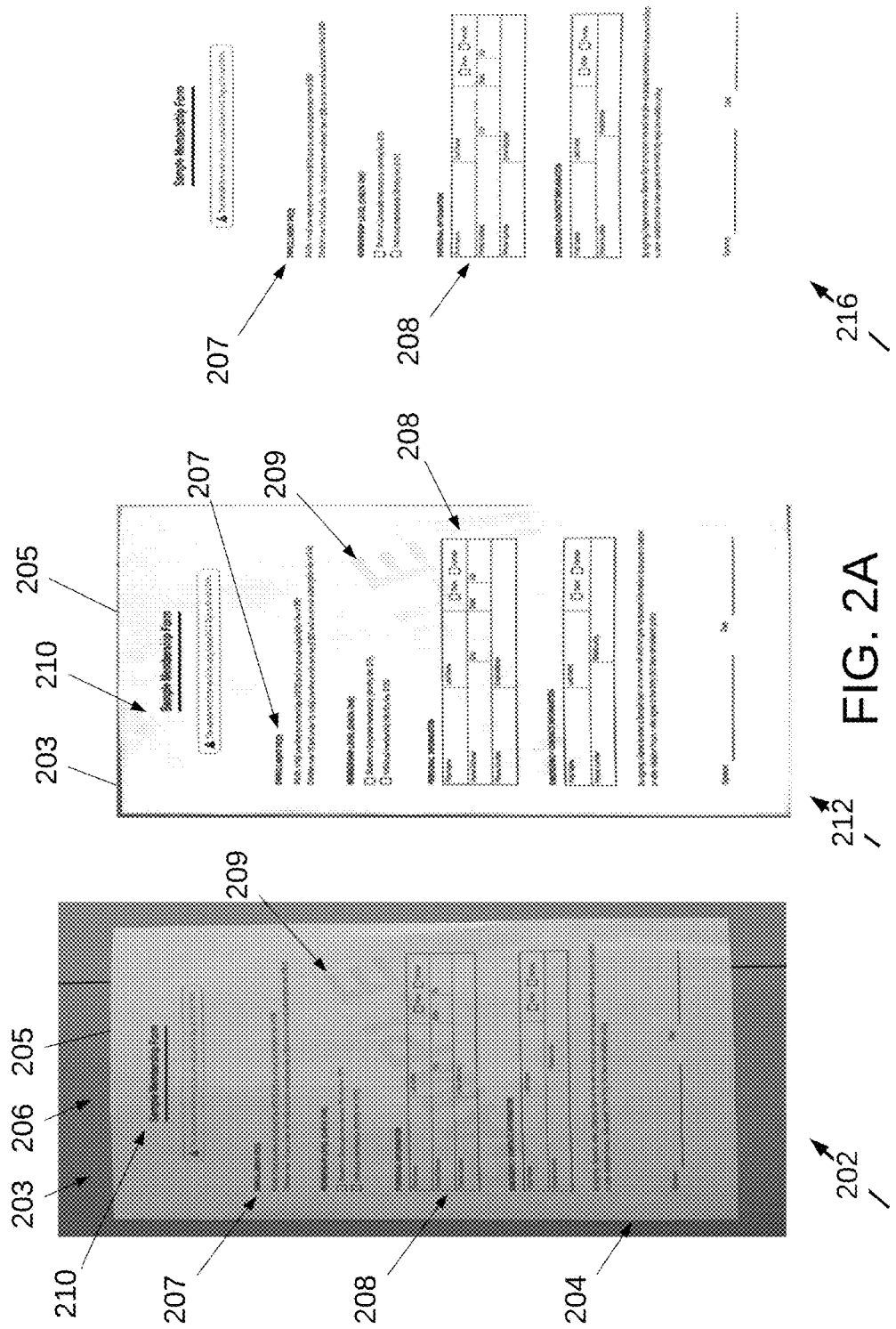
Figure 2B:
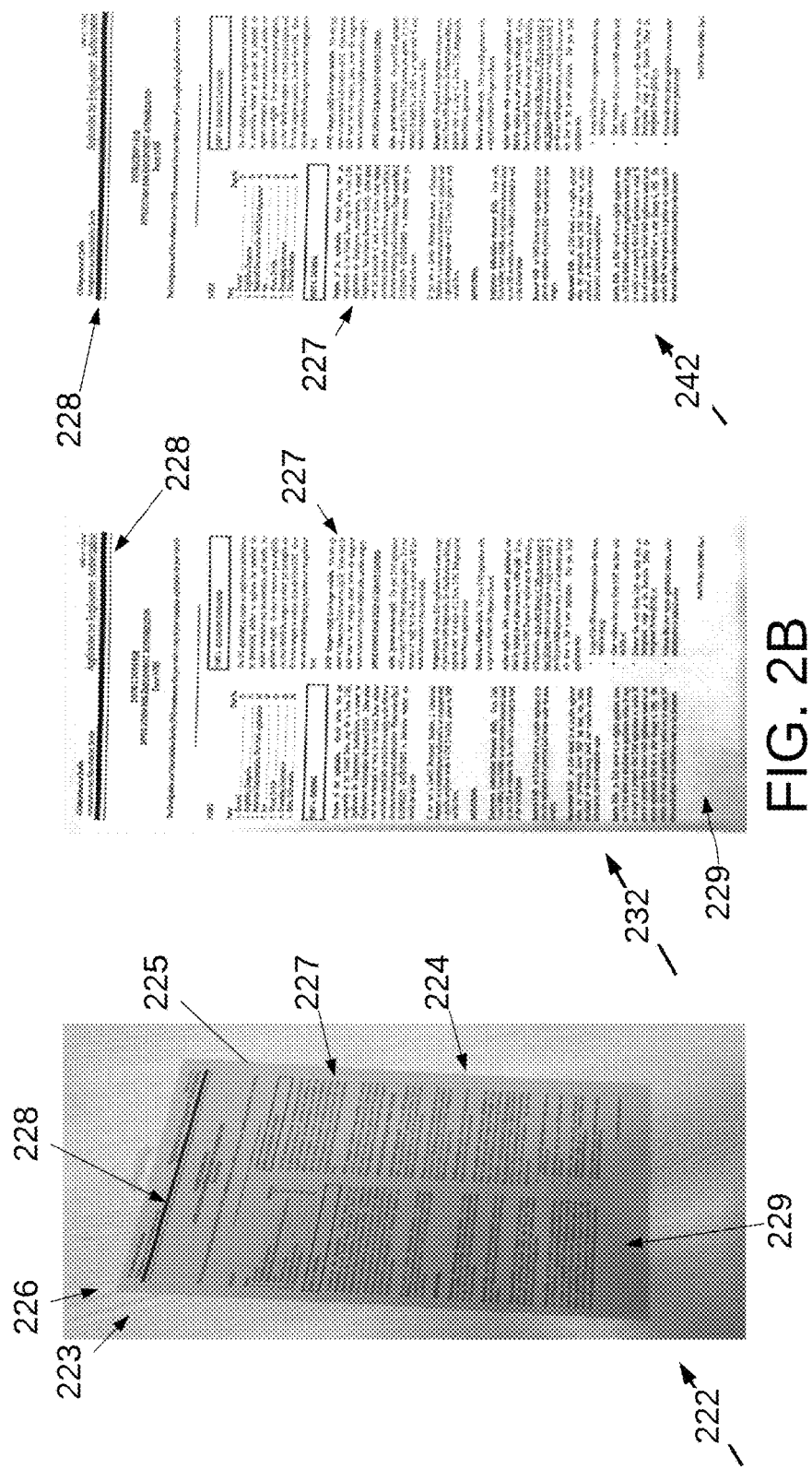

Before explaining the details of the embodiment shown in FIG. 1, it is helpful to explain results achieved by certain embodiments disclosed herein. FIGS. 2A, 2B and 2C each show a separate example of an original image (202, 222, 262) along with the image processed according to a known technique (212, 232, 272) and an embodiment of the invention (216, 242, 282). For the purpose of this disclosure, the original images 202, 222 and 262 are shown in grey-scale instead of in color. Also, the images have been resized for the purposes of inclusion in this disclosure and may be of different sizes, which is immaterial for the purposes of the following explanation. Original image 202 is a photograph of a business form 204 resting on a surface 203 that forms a background portion 206 of the image 202. As can be seen, the business form 204 is rectangular in shape with a perimeter such as seen at 205 comprised of the substantially straight edges of the form 204. The business form 204 is a lighter color paper document, such as white, with dark color text 207 and lines 208 which form the foreground portion of the business form 204. The business form 204 also includes a watermark 209 contained within the boundaries of the perimeter 205 that in certain embodiments can be treated as a part of background portion 206. Also, seen at 210 in FIG. 2A is shading which forms an additional part of background portion 206.

In FIG. 2A, a revised image 212 of original image 202 is shown as generated in accordance with a conventional technique. As seen in revised image 212, text 207 and lines 208 are as in original image 202. The surface 203 can be seen in the image 212 around portions of the perimeter 205. Also visible are portions of the watermark 209 contained within the boundaries of the perimeter 205. Shaded portion 210 is also visible. Also, seen in FIG. 2A, is revised image 216 as generated in accordance with an embodiment of the invention. As seen in revised image 216, the foreground portions such as text 207 and lines 208 are as in original image 202. However, in image 216, background portion 206 has been eliminated by removal of the surface 203 that is outside the boundaries of the perimeter 205 and the watermark 209 and shaded portion 210 contained within the boundaries of the perimeter 205.

In FIG. 2B, original image 222 is also a document 224 that has been photographed and that is resting on surface 223 that forms a background portion 226 of the image 222. As can be seen, the document 224 is rectangular in shape with a perimeter such as seen at 225 comprised of the substantially straight edges of the document 224. The document 224 is a lighter color paper document, such as white, with foreground portions comprising dark color text 227 and lines 228. Shading in the document 224 such as shaded portion 229 can also be seen.

Revised image 232 of original image 222 is shown as generated in accordance with a conventional technique. As seen in revised image 232, foreground portions comprising text 227 and lines 228 are as in original image 222. The surface 223 has been largely removed but some shading in the image 222 can be seen as in the form of shaded portions 229. Revised image 242 is generated in accordance with an embodiment of the invention. As seen in revised image 242, foreground portions comprising text 227 and lines 228 are as in original image 222. In image 242, background portion 226 has been eliminated by removal of the surface 223 that is outside the boundaries of the perimeter 225. Also, the shaded portions 229 that remained in image 232 are not present in image 242.

In FIG. 2C, original image 262 includes a document 266 that has been photographed and that is resting on surface 263 that forms a background portion 267 of the image 262. As can be seen, the document 266 is rectangular in shape with a perimeter such as seen at 265 comprised of the substantially straight edges of the document 266. The document 266 is a lighter color paper document, such as white, with foreground portions comprising dark color text 268 and lines 269. Shading 270 can also be seen in document 266.

Revised image 272 of original image 262 is shown as generated in accordance with a conventional technique. As seen in revised image 272, text 268 and lines 269 are as in original image 262. The surface 263 has been partially removed and some shading in the image 272 can be seen in the form of shaded portions 270. Revised image 282 is generated in accordance with an embodiment of the invention. As seen in revised image 282, foreground portions comprising text 268 and lines 269 are as in original image 262. In image 282, background portion 267 has been eliminated by removal of the surface 263 that is outside the boundaries of the perimeter 265. Also, the shaded portions 270 that remained in image 272 are not present in image 282.

Turning back to FIG. 1, the operation of the embodiment shown in FIG. 1 will be explained in connection with FIG. 3 which shows identifications of portions of an enlarged version of the original image 262 of FIG. 2C. An image file 104 from image content 103 is retrieved, such as image (1) and at step 105 a check is performed of the image file 104 to determine if the image file 104 is encoded as a color image. If so, at step 106 the image file 104 is converted to a greyscale encoded file to generate working image file 109. If image file 104 is originally encoded as a greyscale image, then it is provided at step 107 unchanged to serve as working image file 109.

Steps 108 and 110 may be performed concurrently, or sequentially, or independently of one another. At step 108, the image in working image file 109 is divided into subsections and background portions within the working image file 109 are removed from each subsection and the image is reassembled. In certain embodiments, the results of step 108 may be stored to storage 102.

Figure 3A:
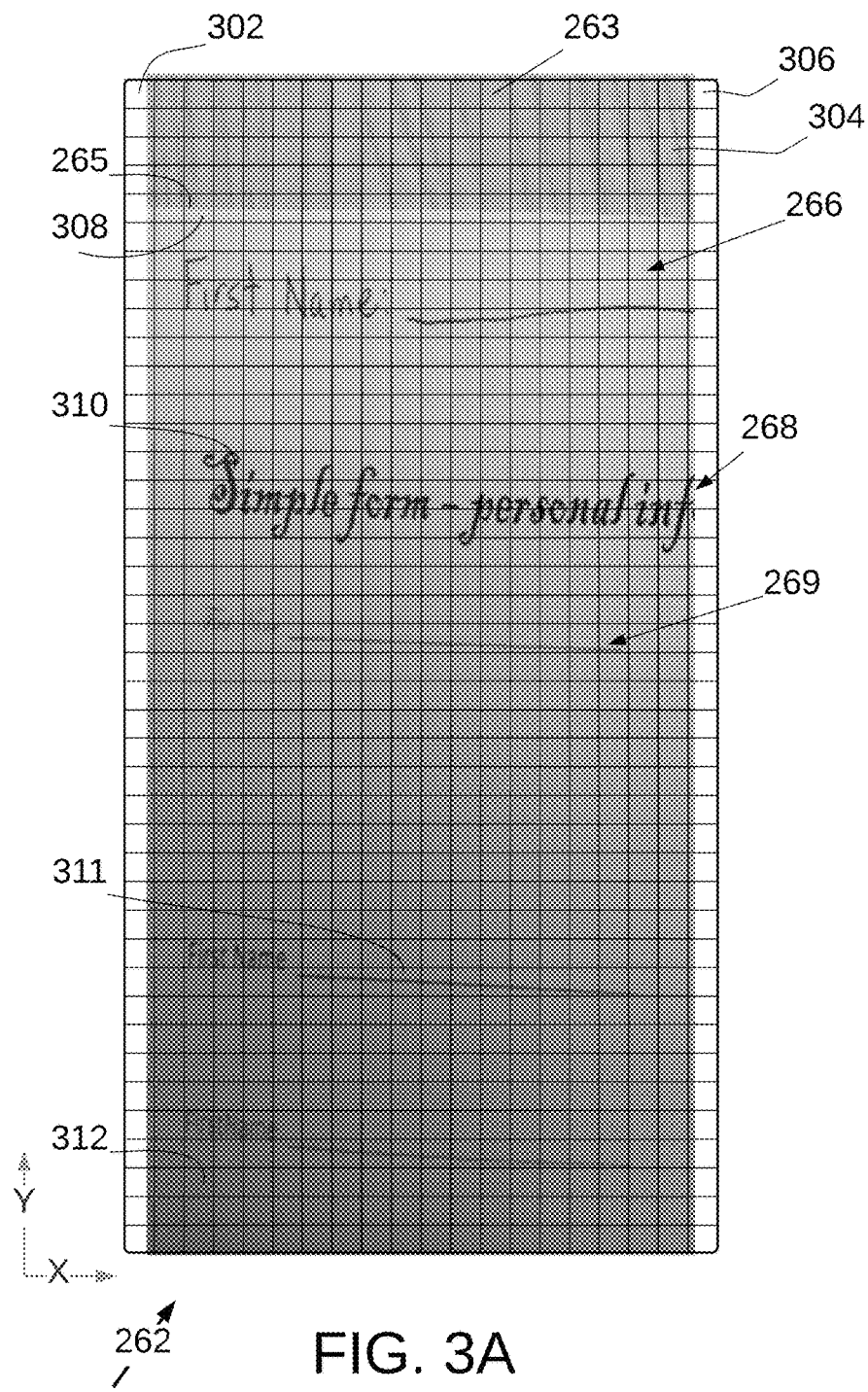
FIGS. 3A and 3B shows identifications of portions of an enlarged version of the original image of FIG. 2C in two different embodiments.
Figure 3B:
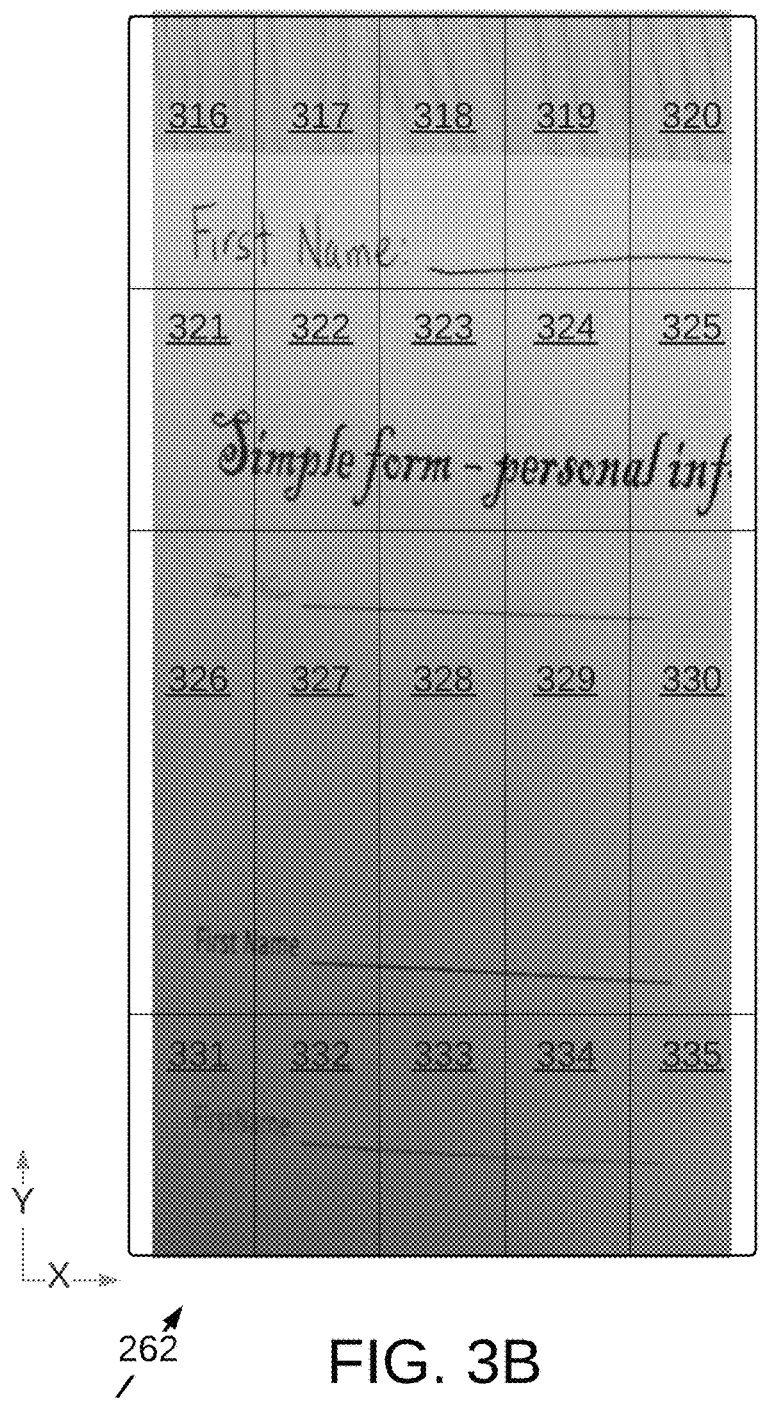

FIGS. 3A and 3B illustrate an image divided into subsections. As seen in FIG. 3A, image 262 seen in FIG. 2C is divided into a plurality of subsections such as subsection 302. The subsections in FIG. 3A are adjacent to one another in the x and y dimensions such that each subsection is adjacent with at least one other subsection in the x and y dimensions. The subsections in FIG. 3A are square with the dimension of each pixel along the x-axis the same as the dimension along the y-axis. Some of the subsections, such as subsection 304, include only background portion 263 that encompasses the entire subsection. Other subsections, such as subsection 306, include both background portion 263 and a portion beyond the perimeter of the image. Other subsections, such as subsection 308, includes the perimeter 265 of the image. Other subsections, such as subsection 310 and subsection 311, include foreground portions such as text 268 and line 269. Other subsections, such as subsection 312, include shading 270 within the perimeter 265 of the document 266. FIG. 3B illustrates another embodiment in which image 262 from FIG. 2B is divided into a smaller number of subsections 316 than shown in FIG. 3A. Also illustrated in FIG. 3B are subsections of unequal size. For example, subsections 316-320 are of a first size, subsections 321-325 are of a second size, different from the first size. Subsections 326-330 are of a third size that is different from the first and second sizes, and subsections 331-335 are of a fourth size that is different from the first, second and third sizes.

Turning back to FIG. 1, at step 110, the image in working image file 109 is divided into subsections according to contours within the image such as text 268, lines 269 and perimeter 265. Background portions within the working image file 109 are then removed from each subsection, and the image is reassembled. In certain embodiments, the results of step 110 may be stored to storage 102. At step 112, the images generated at steps 108 and 110 are combined to form a revised version of image 104 and the revised image, e.g. image (1'), is stored to storage 102, as an image file 114.

Figure 4:
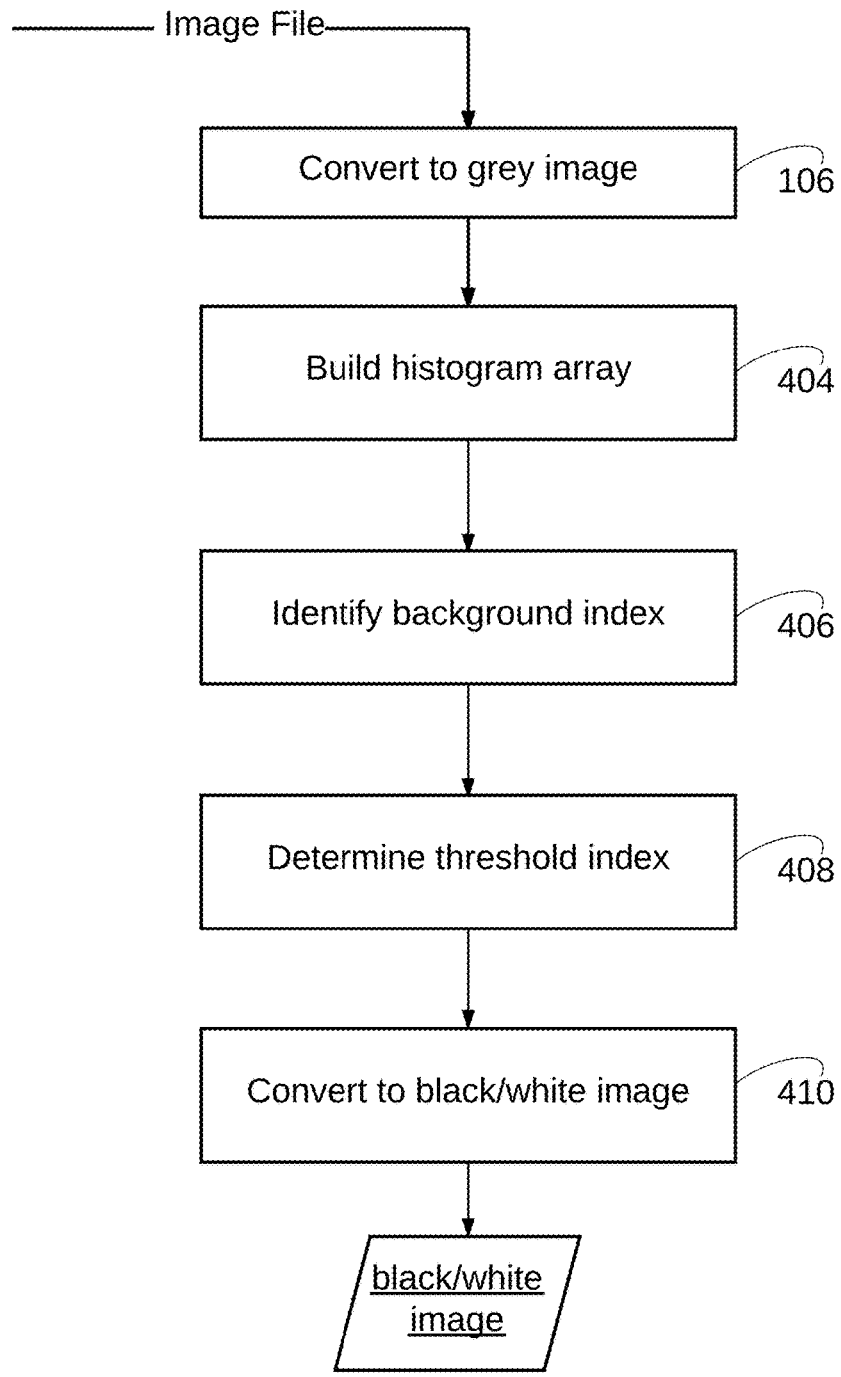
FIG. 4 is a flowchart illustrating further details of an implementation of step 106 of FIG. 1.

FIG. 4 is a flowchart illustrating details of an implementation of converting a color image to a black and white image, which can be used, for example, in steps 106, 108 and 110 of FIG. 1. The image is processed at step 106 to convert each of the color encoded pixels to grey scale by modifying the red, green and blue components of each pixel in accordance with the following formula:

$$grey = red \times 0.299 + green \times 0.587 + blue \times 0.114$$

The foregoing conversion is an efficient technique for images in color spaces such as Y'UV and its relatives, which are used in standard color TV and video systems such as PAL, SECAM, and NTSC. The conversion is performed by generating a nonlinear luma component (grey) directly from gamma-compressed primary intensities (red, green, blue) as a weighted sum. This permits the weighted sum to be calculated quickly without the gamma expansion and compression used in colorimetric greyscale calculations. Alternatively, colorimetric greyscale calculations may be employed.

Figure 5:
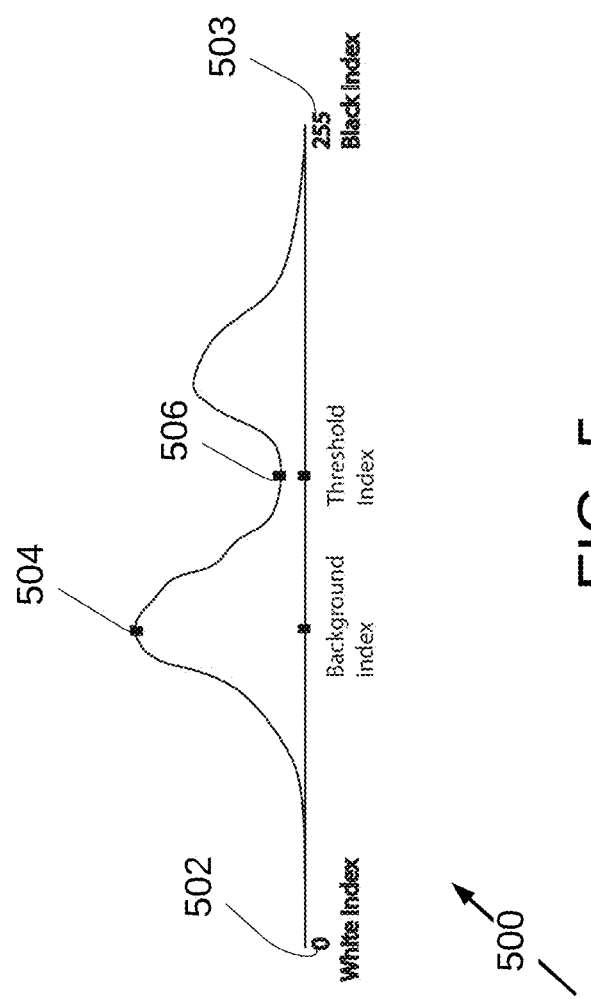
FIG. 5 is a diagram illustrating a histogram employed in an embodiment of the invention.

At step 404 a histogram array 500 as seen in FIG. 5 is generated from the grey scale image. The histogram array 500 represents a graphical representation of light intensity within the grey scale image version of image file 104. The far left of the histogram array at 502 represents pure white, and the far right at 503 (shown as 255 for an embodiment employing 8 bits per pixel) represents pure black. In an alternative embodiment in which the binary color encoding is for two colors other than black and white, the far right point 503 may represent a color other than black.

At step 406, the histogram array 500 is scanned to identify starting at the white index value of 0, seen at 502, the first index on the path to black index 503 in which the histogram array has maximum value, seen at 504, which is assigned as the index to represent the background color. Next at step 408, the histogram array 500 is scanned starting from the background color index 504 on the path to black index 503 to identify the first index in which the histogram array has a minimum value, seen at 506, which is assigned as the index to represent a threshold index. At step 410, each grey scale pixel in the image file 104 is converted to black and white encoding by using the threshold index generated in step 408. Any pixel with a light intensity greater than threshold index 506 is converted to black. Any pixel with a light intensity less than or equal to threshold index 506 is converted to the intensity of the background index 504. The routine exits at step 412 by causing storage of the image file 104 as converted to a black and white image to image file 109.

Figure 6:
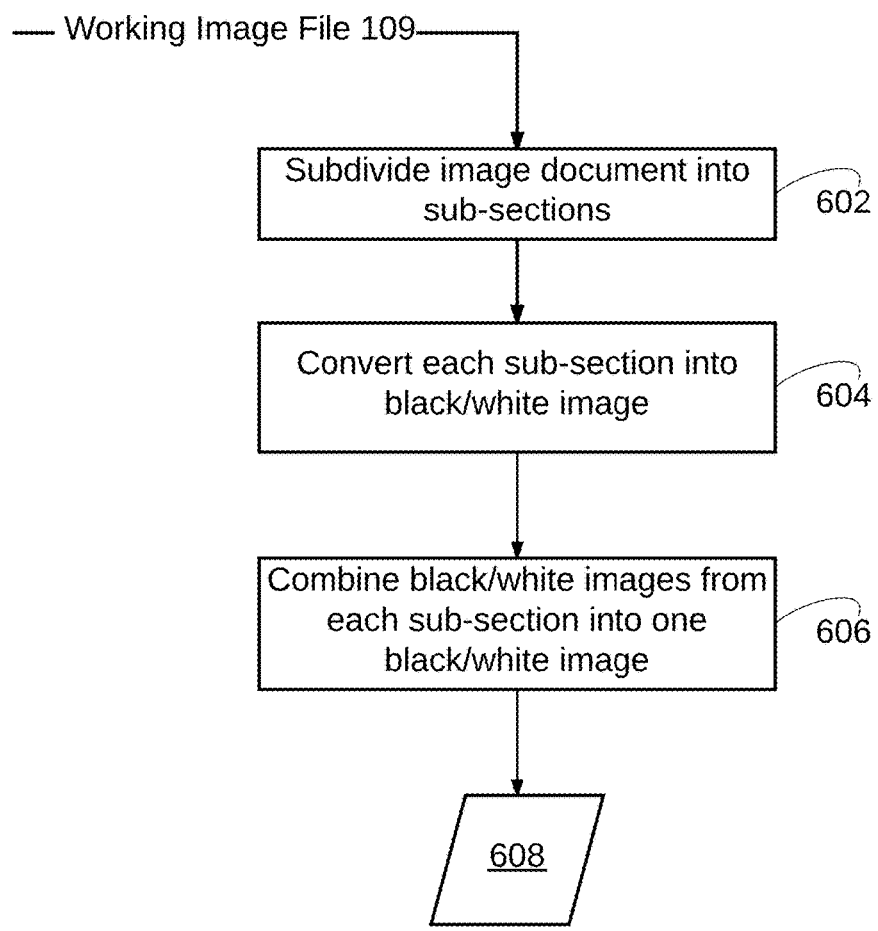
FIG. 6 is a flowchart illustrating further details of an implementation of step 108 of FIG. 1.

FIG. 6 is a flowchart illustrating further details of an implementation of step 108 of FIG. 1 to remove the background from within the image file 109. The image in the working image file 109 is first divided into subsections at step 602. For example, the image is divided as 2×2 (total of 4 subsections). In another example, the image is divided as a 3×3 (total of 9 subsections). In other examples, the image can be divided into a much larger number of subsections (e.g., as shown in FIG. 3A) and/or non-uniform number of sub-sections, such as shown in FIG. 3B. The subsections may be generated by determining an x-dimension and a y-dimension for each subsection, and dividing the image into subsections as a function of the x-dimension and the y-dimension. The subsections may also be rectangular in dimension/or may be of non-uniform sizes, with the subsection sizing possibly being dependent on the content of the image file. Data indicating the boundaries or size of the subsections may be stored as either relative or absolute coordinates. At step 604, each of the subsections is independently converted to a black and white image. In some embodiments, the conversion is employed using the steps and description of FIG. 4. The embodiment in FIG. 4 determines a threshold index based on the content of the image. In other embodiments, the image conversion to black and white may be performed by preselecting a threshold index, for example, in the middle of the range from 0-255, such as 128.

Once each subsection has been independently reprocessed at step 604, the subsections are combined at step 606 to form a single black and white encoded image 608 of the same size as the image in image file 104. The subsections are reassembled to be in the original position as in the working image file. For example, in an embodiment with four subsections with (x, y) positional coordinates (1, 1), (1, 2), (2,1), (2,2) the subsections are repositioned in the original position, using the coordinates (relative or absolute) used in subdividing the image at step 602. The image 608 may be stored to storage 102 or in an alternative embodiment provided directly for use in step 112.

Figure 7:
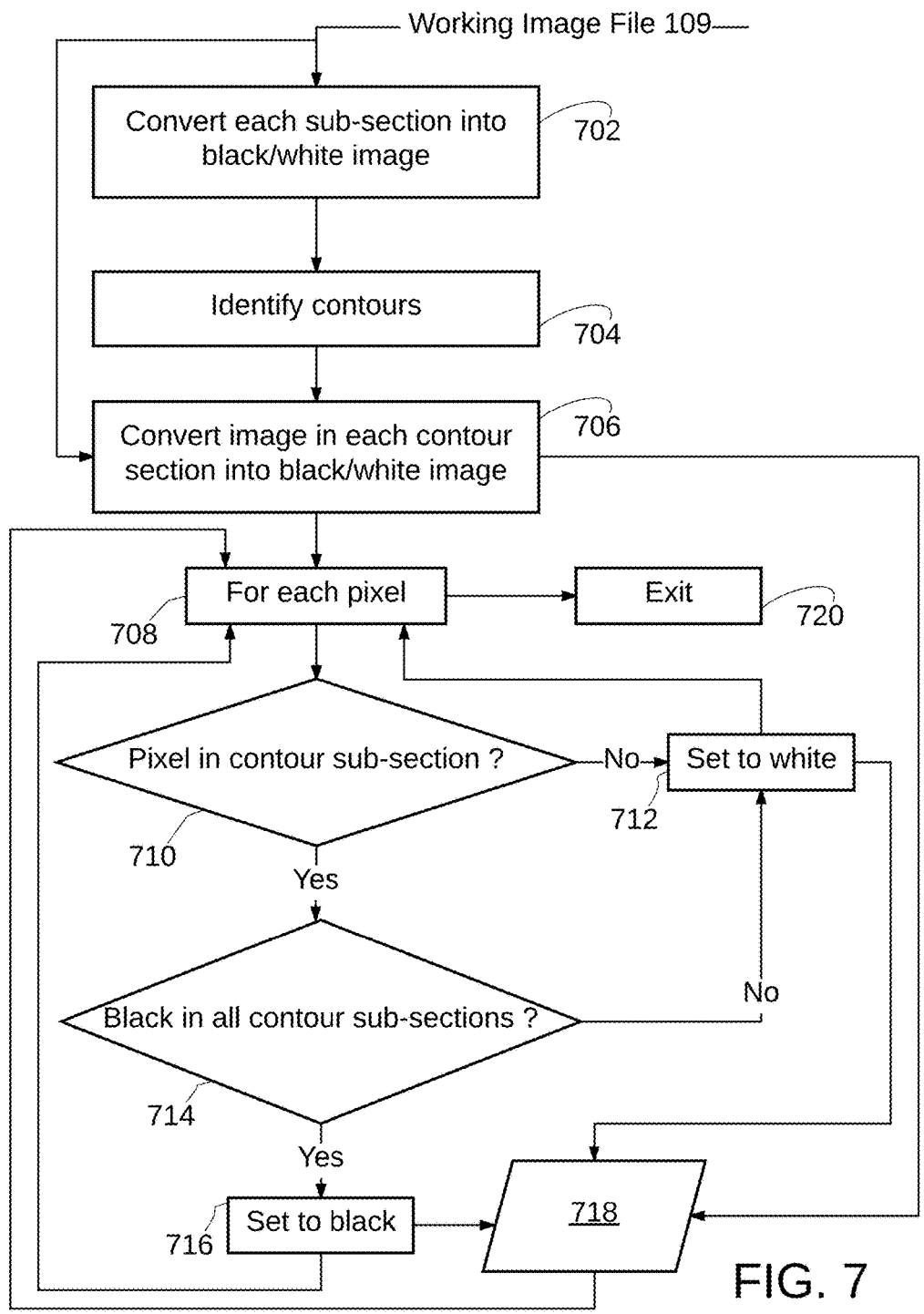
FIG. 7 is a flowchart illustrating further details of an implementation of step 110 of FIG. 1.

FIG. 7 is a flowchart illustrating further details of an implementation of step 110 of FIG. 1 to remove the background by decomposing the image according to the content of working image file 109. At step 702, the working image file 109 is divided into subsections and each subsection is converted to black and white. In the embodiment of FIG. 7, the black and white conversion can be executed by employing the steps of FIG. 4. In other embodiments, as noted in connection with FIG. 4, the threshold index may be preselected. The subsections may be the same size as in step 602, or may be of different sizes.

At step 704, the contours of foreground portions, such as text 268 and lines 269, is identified in each subsection. In some embodiments, this may be performed by employing an 8-way contour tracing technique that operates to identify boundaries within a black and white image. More specifically, such a technique identifies boundary pixels of patterns (e.g., black pixels) within a black and white encoded image.

The technique regards/considers white pixels as background pixels. In 8-way contour tracing, a boundary pixel is a pixel that shares an edge or vertex with at least one white pixel. The 8-way contour tracing technique generates an ordered sequence of the boundary pixels to permit extraction of the general shape of the underlying pattern. Other tracing techniques, may be employed, such as for example, 4-way tracing in which a boundary pixel shares an edge with at least one white pixel. 8-way contour tracing provides 8 surrounding pixels (sometimes referred to as the Moore neighborhood), which provides greater accuracy than 4-way tracing, which provides only 4 surrounding pixels (one for each edge).

At step 706, for each subsection in which a contour has been identified, the steps of FIG. 4 are performed to convert each contour subsection in the working image file 109 to black and white with the result being stored to resulting image file 718. It should be noted that there may be overlap in the contour subsections with any given pixel being in more than one contour subsection. The conversion of each subsection to a black and white image can result in the same pixel being black in some subsections and white in other subsections. Step 706 receives sub-sections from step 704 by dividing working image file 109 according to the identified contours. The size of the subsection employed can vary. Generally, a fewer number of subsections will provide better results. In an alternative embodiment, each identified contour subsection in Step 704 is expanded slightly to ensure that there are some background pixels included in the contour subsection. These expanded contour subsections are then used in Step 706.

At steps 708, 710, 712, 714, 716 and 720 the resulting image file 109 is further processed to remove background information. For each pixel (708) a determination is made at step 710 as to whether the pixel is within a contour subsection as determined at step 704. If the selected pixel is determined to not be within a contour subsection, then it is set to white (712). Contour subsections may overlap, resulting in a pixel being in more than one contour subsection. If the pixel is determined at 710 to be within a contour subsection then at 714 a test is performed to determine if the selected pixel is black in all contour subsections of which it is a part, because as noted above, a pixel may differ in from one subsection to another due to the subsection by subsection conversion in step 706. If the selected pixel is black in all contour subsections, then it is set to black (716). All pixels in the working image file 109 are processed according to steps 708, 710, 712, 714, and 716 and the loop exits at 720 by making the resulting image file 718 available for processing in step 112. In some embodiments, making the file 718 available includes storing the resulting image file 718 to non-transitory storage. In some embodiments resulting image file may be retained in non-transitory memory for immediate further processing by step 112.

Figure 8A:
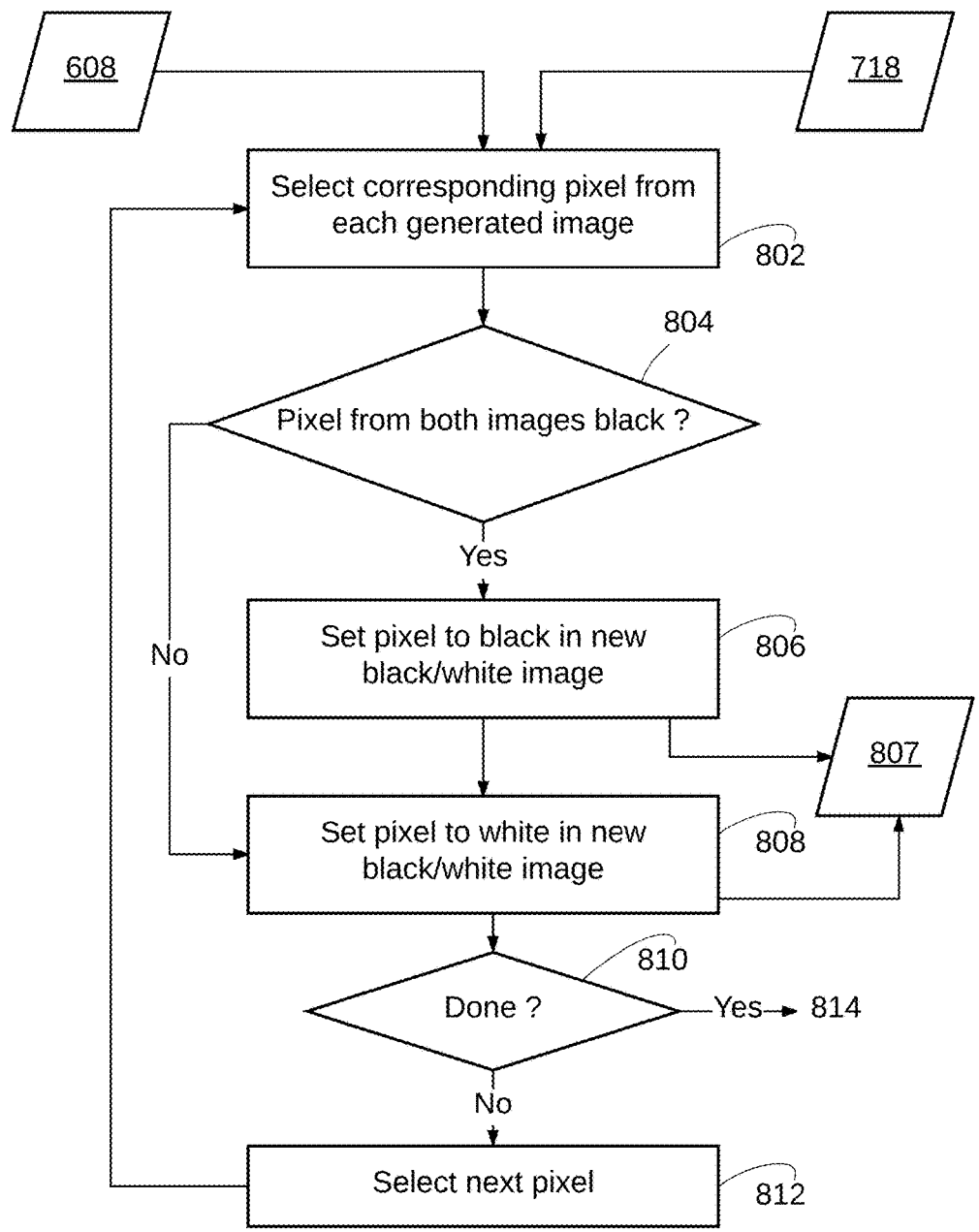
FIGS. 8A and 8B are flowcharts illustrating further details of an implementation of step 112 of FIG. 1.
Figure 8B:
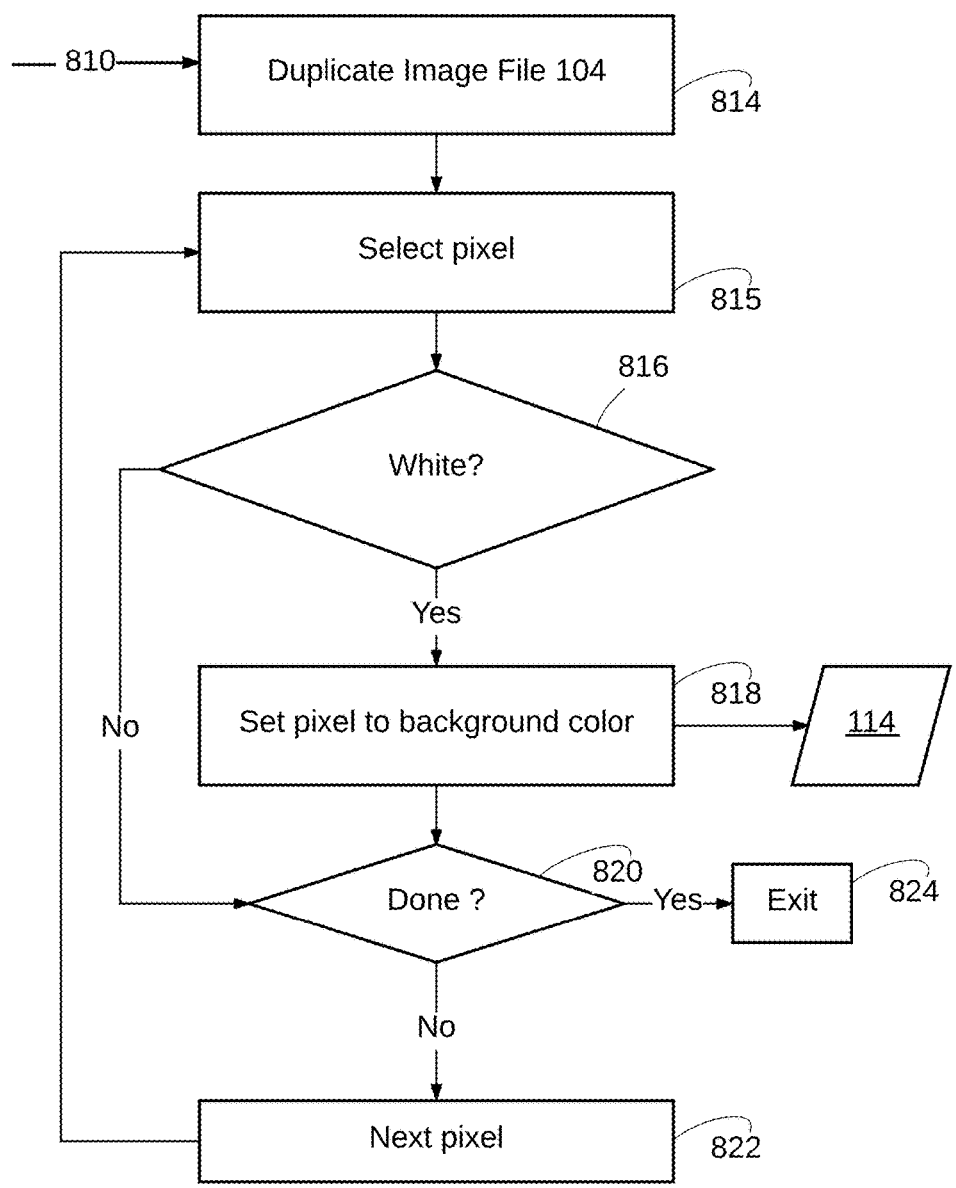

FIGS. 8A and 8B are flowcharts illustrating further details of an implementation of step 112 of FIG. 1. Image files 608 and 718 represent images having the same dimension along the x and y axes and therefore have a pixel by pixel correspondence. The files are processed by selecting at step 802 corresponding pixels from the image files 608 and 718. In other words, for example, the pixel at (x, y) coordinate (1,1) is selected from each image file 608 and 718, then (1,2) and so on. At step 804 the selected pixels are processed to determine if they are black or white. If the selected pixel from each image file 608 and 718 is black, then in the revised image file 807 the corresponding pixel is set to black at step 806. Otherwise, if both selected pixels from image files 608 and 718 are white or if one is white and one is black then the corresponding pixel in the revised image file 807 is set to white at step 808. Steps 802, 804, 806, 808, 810 and 812 are repeated for each pixel in the image files 608 and 712. Once completed, the steps shown in FIG. 8B are performed on the revised image file 807 to convert the image contained therein to color with the background removed to generate image file 114. At step 814 a duplicate of image file 104 is created. Then at steps 815, 816, 818, 820, and 822 the background information from image file 104 is removed by selecting a pixel, determining if it is white (step 816), and if so, setting the selected pixel to a background color, and repeating, via steps 820, 822, until all pixels in the image file 114 have been processed. The background color may be predetermined (such as white) or user selectable or may be a color that corresponds to a background color in the original image in image file 104.

Figure 9:
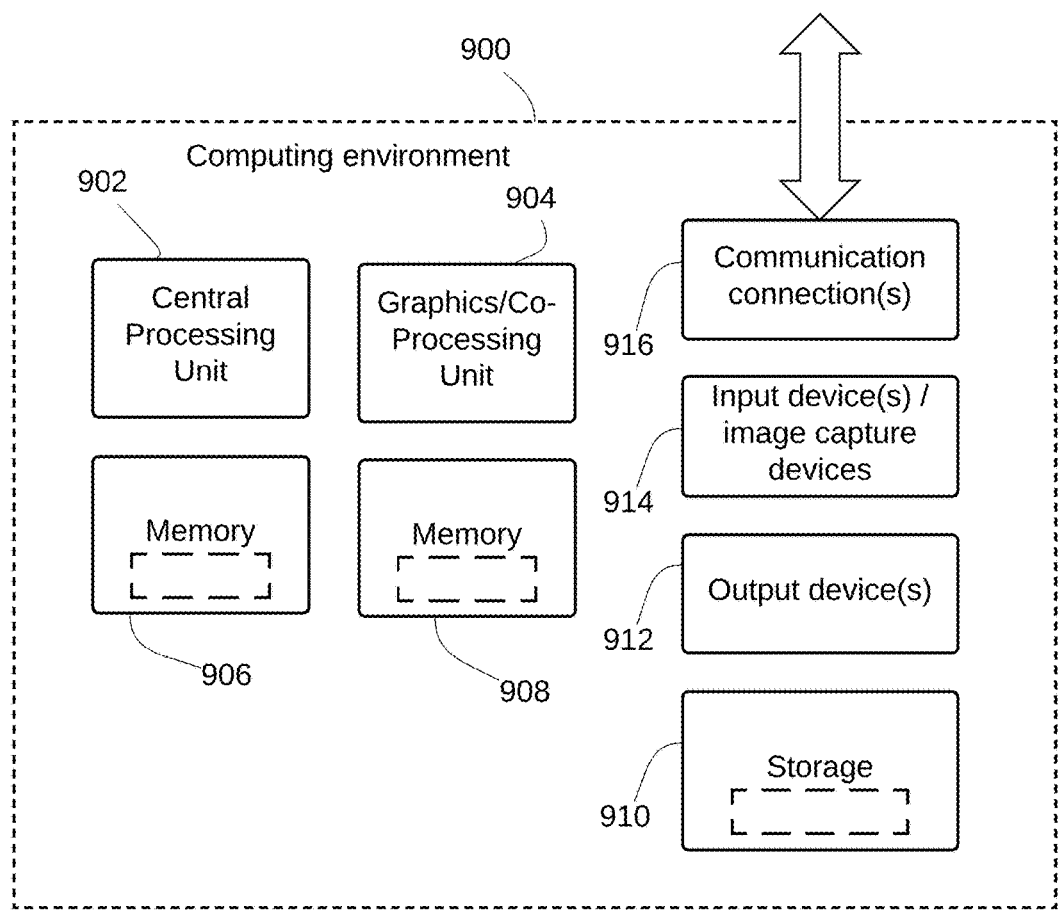
FIG. 9 illustrates a block diagram of hardware that may be employed in various embodiments.

FIG. 9 illustrates a block diagram of hardware that may be employed in various embodiments. FIG. 9 depicts a generalized example of a suitable general purpose computing system 900 in which the described innovations may be implemented to improve the processing speed and efficiency with which the computing system 900 removes background information from digital images. With reference to FIG. 9, the computing system 900 includes one or more processing units 902, 904 and memory 906, 908. The processing units 902, 906 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 100 operates.

Computing system 900 may have additional features such as for example, storage 910, one or more input devices 914, which may include one more image capture devices such as a document scanner and/or camera to generate images 103, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, or any other medium which can be used to store information in a non-transitory way and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 902. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with certain preferred embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer implemented method for removing background information from a digital image, comprising:
    converting each subsection of a first set of subsections and a second set of subsections of a greyscale encoded image to binary color encoding, wherein the converting for each subsection is performed independently of the converting for any other subsection;
    form a revised first set of subsections by removing any background portions from each subsection of the first set of subsections, independent from any other subsection;
    forming a revised second set of subsections by removing any background portions from each subsection in a subset of the second set of subsections that contain foreground information;
    combining (i) each subsection of the revised first set of subsections to generate a first modified version of the digital image and (ii) each subsection of the revised second set of subsections to generate a second modified version of the digital image; and
    creating a revised image by merging the first modified version of the digital image and the second modified version of the digital image.

2. The method of claim 1, wherein identifying a subset of the second set of subsections that contain foreground information and removing any background portions from each subsection in the subset of the second set of subsections comprises:
    converting each subsection of the second set of subsections into a binary color encoded subsection to generate a third set of binary color encoded subsections;
    for each subsection of the third set of binary color encoded subsections, identifying contours in the subsection to identify outlines of an image content of the digital image to generate outline data indicative of coordinates of an outline of the digital image;
    converting each subsection of the second set of subsections that includes the outline of the digital image into a binary color encoded subsection to generate a fourth set of binary color encoded subsections;
    combining the subsections of the fourth set of binary color encoded subsections to generate a single binary color encoded image;
    identifying the subsections in the third set of binary color encoded subsections that are not part of the fourth set of binary color encoded subsections;
    converting each identified subsection to a first binary encoded color value indicative of a background color encoding; and
    adding the identified subsections to the single binary color encoded image to generate the second set of subsections.

3. The method of claim 1, wherein merging the first modified version of the digital image and the second modified version of the digital image to create the revised image comprises:
    selecting corresponding subsections from the first set of subsections of the first modified version of the digital image and from the second set of subsections of the second modified version of the digital image, and for each pixel in the corresponding subsections,
    setting the pixel to a foreground binary color encoding in the revised image if the pixel from both corresponding subsections is encoded in the foreground binary color encoding, and
    setting the pixel to a background binary color encoding in the revised image if at least one pixel from both corresponding subsections is encoded in the background binary color encoding.

4. The method of claim 1, further comprising:
    retrieving an original image from digital storage; and
    generating the greyscale encoded image by converting the original image to greyscale encoding if the original image is encoded as a color image.

5. The method of claim 1, wherein the step of dividing the greyscale encoded image into a first set of subsections comprises:
    determining an x-dimension and a y-dimension for each subsection; and dividing the greyscale encoded image into the first set of subsections as a function of the x-dimension and the y-dimension.

6. The method of claim 1, wherein converting each subsection of the first set of subsections, independent from any other subsection, to binary color encoding comprises:
    generating a histogram array indicative of light intensity within greyscale encoding of the subsections;
    generating a background color by identifying a maximum value in the histogram array;
    generating a threshold value by identifying a first minimum value in the histogram array; and
    converting the greyscale encoding to binary color encoding as a function of the threshold value by converting any pixel with a value greater than the threshold value into a first binary encoded color value pixel and converting any pixel with a value less than the threshold value into a second binary encoded color value.

7. The method of claim 4, further comprising:
converting the first modified version of the digital image from binary color encoding to multibit color encoding if the original image is encoded as a color image by creating a new image document by duplicating the original image;
for each pixel in the new image document and the revised image, selecting a pixel from the new image document and selecting a pixel from the revised image that corresponds to the selected pixel from the new image document; and
for any pixel in the revised image that is encoded in a background binary color encoding, setting the corresponding pixel in the new image document to a selected multibit background color.

8. The method of claim 7, wherein the selected multibit background color is user determined.

9. The method of claim 7, wherein the selected multibit background color is determined as a function of the background portions of the original image.

10. The method of claim 1, wherein identifying a subset of the second set of subsections that contain foreground information and removing any background portions from each subsection in the subset of the second set of subsections comprises:
converting each subsection into a binary color encoded subsection to generate a third set of binary color encoded subsections;
expanding each subsection of the third set of binary color encoded subsections to include surrounding pixels;
for each subsection of the third set of binary color encoded subsections, identifying contours in the subsection to identify an outline of the digital image;
storing outline data indicative of coordinates of the outline of the digital image;
converting each subsection of the third set of binary color encoded subsections that includes a portion of the outline of the digital image into a binary color encoded subsection to generate a fourth set of binary color encoded subsections;
combining the subsections of the fourth set of binary color encoded subsections into a single binary color encoded image;
identifying the subsections in the third set of binary color encoded subsections that are not part of the fourth set of binary color encoded subsections;
converting each identified subsection to a background binary color encoded image; and
adding the identified subsections to generate the second set of subsections.

11. A computing system comprising:
means for dividing a greyscale encoded image into a first set of subsections and a second set of subsections;
means for independently converting each subsection of the first set of subsections and the second set of subsections to binary color encoding;
means for forming a revised first set of subsections by independently removing any background portions from each subsection of the first set of subsections;
means for combining the revised first set of subsections to generate a first modified version of a digital image;
means for forming a revised second set of subsections by identifying a subset of the second set of subsections that contain foreground information and removing any background portions from each subsection in the subset of the second set of subsections;
means for combining the revised second set of subsections to generate a second modified version of the digital image;
means for creating a revised image by merging the first modified version of the digital image and the second modified version of the digital image; and
means for causing storage of the revised image to digital storage.

12. The computing system of claim 11, wherein the means for forming a revised second set of subsections by identifying the subset of the second set of subsections that contain the foreground information and removing any of the background portions from each subsection in the subset of the second set of subsections comprises:
means for converting each subsection of the second set of subsections into a binary color encoded subsection to generate a third set of binary color encoded subsections;
for each subsection of the third set of binary color encoded subsections, means for identifying contours in the subsection to identify outlines of an image content of the digital image to generate outline data indicative of coordinates of an outline of the digital image;
means for converting each subsection of the second set of subsections that includes the outline of the digital image into a binary color encoded subsection to generate a fourth set of binary color encoded subsections;
means for combining the subsections of the fourth set of binary color encoded subsections to generate a single binary color encoded image;
means for identifying the subsections in the third set of binary color encoded subsections that are not part of the fourth set of binary color encoded subsections;
means for converting each identified subsection to a first binary encoded color value indicative of a background color encoding; and
means for adding the identified subsections to the single binary color encoded image to generate the second set of subsections.

13. The computing system of claim 11, wherein the means for creating the revised image by merging the first modified version of the digital image and the second modified version of the digital image to create the revised image comprises:
means for selecting corresponding subsections from the first set of subsections of the first modified version of the digital image and from the second set of subsections of the second modified version of the digital image, and for each pixel in the corresponding subsections,
means for setting the pixel to a foreground binary color encoding in the revised image if the pixel from both corresponding subsections is encoded in the foreground binary color encoding, and
means for setting the pixel to a background binary color encoding in the revised image if at least one pixel from both corresponding subsections is encoded in the background binary color encoding.

14. The computing system of claim 11, further comprising:
means for retrieving an original image from digital storage; and
means for generating the greyscale encoded image by converting the original image to greyscale encoding if the original image is encoded as a color image.

15. The computing system of claim 11, wherein the means for dividing the greyscale encoded image into the first set of subsections comprises:
    means for determining an x-dimension and a y-dimension for each subsection; and dividing the greyscale encoded image into the first set of subsections as a function of the x-dimension and the y-dimension.

16. A non-transitory computer-readable medium having instructions stored thereon, the instructions executable by a processing device to perform operations comprising:
    receiving a greyscale encoded image;
    dividing the greyscale encoded image into a first set of subsections and a second set of subsections;
    converting each subsection of the first set of subsections and the second set of subsections, independent from any other subsection, to binary color encoding;
    removing any background portions from each subsection of the first set of subsections, independent from any other subsection, to form a revised first set of subsections;
    combining each subsection of the revised first set of subsections to generate a first modified version of a digital image;
    identifying a subset of the second set of subsections that contain foreground information and removing any background portions from each subsection in the subset of the second set of subsections to form a revised second set of subsections;
    combining each subsection of the revised second set of subsections to generate a second modified version of the digital image; and
    merging the first modified version of the digital image and the second modified version of the digital image to create a revised image.

17. The non-transitory computer-readable medium of claim 16, wherein converting each subsection of the first set of subsections, independent from any other subsection, to binary color encoding comprises:
    generating a histogram array indicative of light intensity within greyscale encoding of the first set of subsections;
    generating a background color by identifying a maximum value in the histogram array;
    generating a threshold value by identifying a first minimum value in the histogram array; and
    converting the greyscale encoding to binary color encoding as a function of the threshold value by converting any pixel with a value greater than the threshold value into a first binary encoded color value pixel and converting any pixel with a value less than the threshold value into a second binary encoded color value.

18. The non-transitory computer-readable medium of claim 16, the instructions further executable by the processing device to perform operations comprising:
    converting the first modified version of the digital image from binary color encoding to multibit color encoding if the original image is encoded as a color image by creating a new image document by duplicating the original image;
    for each pixel in the new image document and the revised image, selecting a pixel from the new image document and selecting a pixel from the revised image that corresponds to the selected pixel from the new image document; and
    for any pixel in the revised image that is encoded in a background binary color encoding, setting the corresponding pixel in the new image document to a selected multibit background color.

19. The non-transitory computer-readable medium of claim 18, wherein the selected multibit background color is user determined or determined as a function of the background portions of the original image.

20. The non-transitory computer-readable medium of claim 16, wherein identifying a subset of the second set of subsections that contain foreground information and removing any background portions from each subsection in the subset of the second set of subsections comprises:
    converting each subsection into a binary color encoded subsection to generate a third set of binary color encoded subsections;
    expanding each subsection of the third set of binary color encoded subsections to include surrounding pixels;
    for each subsection of the third set of binary color encoded subsections, identifying contours in the subsection to identify an outline of the digital image;
    storing outline data indicative of coordinates of the outline of the digital image;
    converting each subsection of the third set of binary color encoded subsections that includes a portion of the outline of the digital image into a binary color encoded subsection to generate a fourth set of binary color encoded subsections;
    combining the subsections of the fourth set of binary color encoded subsections into a single binary color encoded image;
    identifying the subsections in the third set of binary color encoded subsections that are not part of the fourth set of binary color encoded subsections;
    converting each identified subsection to a background binary color encoded image; and
    adding the identified subsections to generate the second set of subsections.

* * * * *